Dec. 25, 1928.

P. DASEN 1,696,192

CLEARING GUARD FOR PLANTER SHOES

Filed June 9, 1927

Inventor
Paul Dasen
By his Attorneys
Williamson Reij & Williamson

Patented Dec. 25, 1928.

1,696,192

UNITED STATES PATENT OFFICE.

PAUL DASEN, OF OTTOSEN, IOWA, ASSIGNOR TO HARRY J. DORWEILER, OF HAMEL, MINNESOTA.

CLEARING GUARD FOR PLANTER SHOES.

Application filed June 9, 1927. Serial No. 197,617.

This invention relates to clearing guards for planter shoes and similar farm implements.

It is an object of this invention to provide such a guard which will act in advance of the planter shoe or similar implement to clear obstructions such as corn stalks, small stones, weeds and other rubbish from the path of the shoe or implement.

It is a further object of the invention to provide such a clearing guard which will project downwardly into the ground when in use but which will be resiliently mounted so that as a hard obstruction, such as a large stone, is struck, the guard will yield to carry the same out of the ground and over the obstruction.

Yet a further object is to provide in such a device means for varying the angle of inclination of the guard with the ground.

Figure 1:
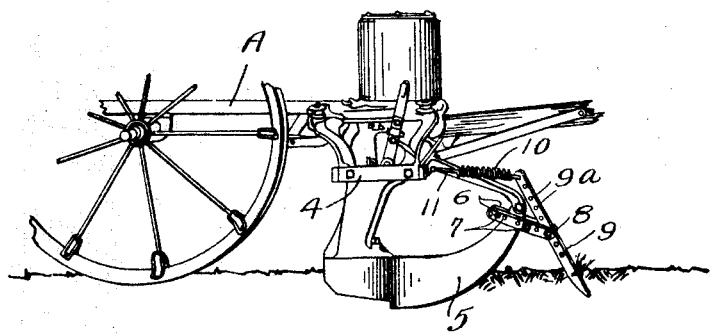
Figure 2:
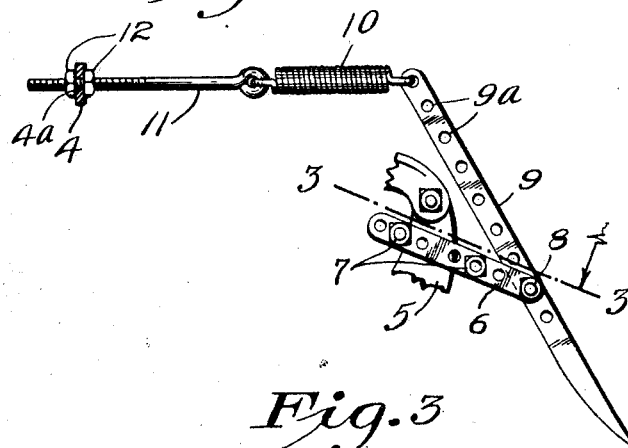
Figure 3:
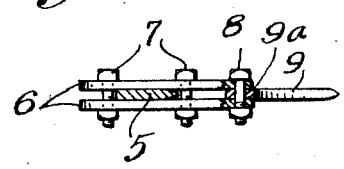

These and other objects and advantages of the present invention will more fully appear from the following description made in connection with the accompanying drawings, wherein like reference characters refer to the same or similar parts throughout the various views and, in which, Fig. 1 is a perspective view of the device as applied to the planter shoe of a corn planter of standard construction;

Fig. 2 is a view on a large scale showing the device in side elevation with certain parts of the planter broken away, and, Fig. 3 is a section taken substantially on the line 3—3 of Fig. 2, as indicated by the arrows.

Referring to the drawings, a corn planter A of standard construction is illustrated which includes the cross frame 4 and the planter shoe 5 adapted to be secured to the cross frame in a well known manner. In accordance with the present invention, a clamp is provided which is adapted to be secured to the front end of the shoe 5. Although various types of clamps may be used, in the embodiment of the invention illustrated, the clamp comprises the two spaced bars 6, one being provided at either side of the shoe 5, and the bolts 7 which extend through holes in the bar 6 and clamp the bars tightly against the shoe 5. A plurality of spaced holes are provided in the bars 6 so that the bolts 7 can be variably spaced to permit the clamp being properly secured on various types of planter shoes or other implements. A bolt or rivet 8 extends through the outermost bolt holes in bars 6 and carries thereon with freedom for swinging pivotal movement, a tooth 9. Tooth 9 is formed from a straight bar and is preferably pointed at its lower end to provide a ground engaging portion. Holes 9ª are provided in the tooth at spaced points, the lower holes being adapted to receive the bolt 8 to vary both the height of the tooth from the ground and also to vary the inclination of the tooth with the ground. A coiled tension spring 10 is secured at its forward end to one of the upper holes 9ª while at the rear end the spring is connected to the eye of a threaded stud 11. The stud 11 is adapted to extend through a slot 4ª formed in the forward side of the planter cross frame 4 and to be secured to the frame by means of the two nuts 12 screwed on the rear threaded end of the stud 11. One of the nuts 12 is disposed at either side of the forward side of the cross frame 4 and the nuts are screwed tightly against the frame to hold the stud 11 in position. By placing the nuts 12 at varying positions on the threaded end of stud 11, the stud may be adjusted so that the forward end of the same will project varying distances from the cross frame 4 to vary the tension on spring 10 and change the angle of inclination of the tooth 9 with the ground. If desired, various other types of securing means may be provided for fastening the rear end of the spring 10 to the frame of the planter or other implement.

In actual use, the tooth 9 will preferably be adjusted by means of varying the tension of spring 10 as above described and also by shifting bolt 8 to various holes 9ª so that the tooth 9 when engaged with the ground will be inclined forwardly and downwardly from the planter shoe to a point on about the same horizontal level as the bottom of the shoe 5. Accordingly, as the machine moves forwardly over the ground, the lower portion of the tooth 9 will extend downwardly into the ground to approximately the same depth as the depth of the shoe 5 and the tooth will project from the shoe immediately ahead of the shoe in the path that the shoe will follow. Corn stalks, sticks, small stones and other rubbish will accordingly be caught by the tooth 9 and thrown to one side of the path of the planter shoe and such rubbish will not interfere with the action of the planter, as is the case where no clearing guard is used.

If during travel of the planter, the tooth 9 strikes a large rock or other hard obstruction, the spring 10 will yield sufficiently to permit the upper end of the tooth to be thrown forwardly to carry the ground engaging portion of the tooth rearwardly out of the ground and over the obstruction. By variably adjusting the normal angle of inclination of the tooth 9 by varying the position of the nuts 12 and bolt 8, the guard may be set so that the tooth will maintain its ground engaging position when obstructions of certain size, weight and hardness are struck while when other obstructions are struck of greater size, weight and hardness the tooth will ride over the same. In operation the tooth will assume a more or less vibratory motion so that when corn stalks or other rubbish are caught by the tooth, they will be jiggled off the sides of the same by the motion of the tooth.

The device is of simple and easy construction and can be readily attached to practically any type of corn planter or similar farm implement now on the market. The device is now being put on the market and has met with very good commercial success.

It will, of course, be understood that various changes may be made in the form, details, arrangement and proportions of the various parts without departing from the scope of the present invention, which, generally stated, consists in the matter shown and described and set forth in the appended claims.

What is claimed is:

1. A clearing guard for planter shoes, comprising a clamp adapted to be secured to the forward end of a planter shoe, a tooth pivoted adjacent its medial portion in said clamp and having a portion adapted to extend downwardly and forwardly therefrom into the ground in the path of said implement, said tooth having a portion projecting upwardly and rearwardly from said clamp, a coil spring connected at one end with the upper end of said tooth member and a hook adapted to be adjustably connected at its one end with the frame of a planter and secured at its other end to the other end of said spring.

2. A clearing guard for planter shoes and similar implements, comprising supporting means adapted to be mounted on such an implement, a tooth member pivoted in said supporting means adjacent its center and adapted to project downwardly ahead of the implement and in the path thereof, resilient means adapted to be fixed at one end and adapted to be attached at its other end adjacent one end of said tooth member, to normally hold said tooth member with a portion thereof projecting into the ground but being adapted to yield as said portion strikes a hard obstruction to allow said portion to be carried out of the ground and over the obstruction, and means for varying the point of attachment of said resilient means to said tooth member relative to the pivotal axis of the tooth member to vary the amount of resistance required before said resilient means will yield sufficiently to permit the ground engaging end thereof to be carried out of the ground.

3. A clearing guard for planter shoes, comprising a clamp adapted to be secured to the forward end of a planter shoe and to be projected to varying distances forwardly therefrom and vertically in respect thereto, a ground engaging tooth having a plurality of spaced pivot holes therein adjacent its medial portion, a pivot secured in the forward portion of said clamp and adapted to extend through any one of said pivot holes to situate the lower end of said tooth at a desired height in respect to the bottom of the shoe, and a spring secured at one end adjacent the upper end of said tooth and adapted to be fixed at its other end to the frame of the planter.

4. A clearing guard for planter shoes and similar implements, comprising supporting means adapted to be mounted on such an implement, a tooth member pivoted in said supporting means adjacent its medial portion and having a lower end adapted to project downwardly ahead of the implement and in the path thereof, and resilient means secured adjacent the upper end of said tooth member and adapted to determine from its tension the normal angular disposition of said tooth member with the ground, and means for varying the tension of said resilient means to vary the normal disposition of said tooth member, said resilient means being normally adapted to hold said tooth member with a portion thereof projecting into the ground, but being adapted to yield as said portion strikes a hard obstruction to allow said portion to be carried out of the ground.

In testimony whereof I affix my signature.

PAUL DASEN.